(12) United States Patent
Kenney et al.

(10) Patent No.: US 10,277,534 B2
(45) Date of Patent: Apr. 30, 2019

(54) SUPPLEMENTAL CONNECTION FABRIC FOR CHASSIS-BASED NETWORK DEVICE

(71) Applicant: Juniper Networks, Inc., Sunnyvale, CA (US)

(72) Inventors: John Kenney, Groton, MA (US); Christopher Otte, Hollis, NH (US); Bhavesh Patel, Fremont, CA (US); Valery Kugel, Mountain View, CA (US); Muhammad Sagarwala, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 296 days.

(21) Appl. No.: 15/170,608

(22) Filed: Jun. 1, 2016

(65) Prior Publication Data
US 2017/0353402 A1    Dec. 7, 2017

(51) Int. Cl.
*H04L 12/931* (2013.01)
*H04L 12/935* (2013.01)
*H04L 12/803* (2013.01)

(52) U.S. Cl.
CPC .......... *H04L 49/40* (2013.01); *H04L 49/205* (2013.01); *H04L 49/3009* (2013.01); *H04L 49/45* (2013.01); *H04L 47/125* (2013.01)

(58) Field of Classification Search
CPC ... H04L 49/40; H04L 49/205; H04L 49/3009; H04L 49/45; H04L 49/125; H04L 49/101;
(Continued)

(56) References Cited

U.S. PATENT DOCUMENTS

2004/0122911 A1* 6/2004 Chong ................ G06F 13/4022
                                                      709/217
2007/0110088 A1* 5/2007 Kemp ................ H04L 49/1515
                                                      370/419

(Continued)

FOREIGN PATENT DOCUMENTS

EP         2 164 209         9/2009

OTHER PUBLICATIONS

Extended European Search Report corresponding to EP 16194000.2 dated Jul. 4, 2017, 8 pages.

*Primary Examiner* — Andrew W Chriss
*Assistant Examiner* — Rasha K Fayed
(74) *Attorney, Agent, or Firm* — Harrity & Harrity, LLP (57) ABSTRACT

A system may receive, by a switching component of the system, network traffic to be provided to an I/O component of the network device. The system may route, by the switching component, the network traffic to the I/O component based on whether the I/O component is connected to the switching component via the first connections and/or via second connections. The first connections may be connections via a chassis of the system. The second connections may be connections via a connector component that is removable from the switching component. The network traffic may be routed via the first connections and the second connections when the I/O component is connected via the first connections and the second connections. The network traffic may be routed via the first connections and not via the second connections when the I/O component is connected via the first connections and not via the second connections.

20 Claims, 7 Drawing Sheets

(58) Field of Classification Search
CPC ..... H04L 49/1515; H04L 49/25; H04L 49/30; H04L 49/55; H04L 12/40; H04L 12/462; H04L 12/933; H04L 12/931; H04L 12/947; H04L 12/935; H04L 12/939; H04L 29/06306; H04L 29/06326; H04L 29/08081; H04L 29/08783; H04L 29/08927; H04L 41/00; H04L 41/0226; H04L 41/08; H04L 41/0803; H04L 41/22; H04L 41/28; H04L 45/00; H04L 65/1083; H04L 67/10; H04L 67/125; H04L 67/14; H04L 67/36; H04L 67/38; H04L 69/08; H04L 69/12; H04L 69/18; G06F 17/5022; G06F 17/5027; G06F 13/4022; G06F 13/4282; G06F 13/385; G06F 15/17381; G06F 15/17343
USPC .................................................. 370/392, 419
See application file for complete search history.

(56) References Cited

U.S. PATENT DOCUMENTS

| | | | | |
|---|---|---|---|---|
| 2010/0284163 | A1* | 11/2010 | Chan | H03H 7/463 361/818 |
| 2012/0036307 | A1* | 2/2012 | Palchenko | G06F 21/12 710/316 |
| 2012/0063310 | A1* | 3/2012 | Sarwar | H04L 47/10 370/235 |
| 2013/0335907 | A1* | 12/2013 | Shaw | G06F 1/183 361/679.31 |
| 2016/0085237 | A1* | 3/2016 | Yunoki | H04L 29/14 726/22 |
| 2016/0183402 | A1* | 6/2016 | Tamarkin | H04L 49/30 361/679.4 |
| 2016/0210257 | A1* | 7/2016 | Szeto | G06F 13/4022 |
| 2017/0346766 | A1* | 11/2017 | Dutta | H04L 49/40 |

* cited by examiner

SUPPLEMENTAL CONNECTION FABRIC FOR CHASSIS-BASED NETWORK DEVICE

BACKGROUND

Network devices (e.g., routers, gateways, switches, hubs, etc.) may route network traffic between devices. The network traffic may be associated with information that identifies a source and/or destination of the network traffic (e.g., headers, footers, etc.), and the network devices may use this information to route the network traffic. For example, the network traffic may include packets to be routed, and the network devices may use packet headers associated with the packets to switch or route the network traffic to an appropriate device.

SUMMARY

According to some possible implementations, a network device may include a chassis that includes a set of first connections. The chassis may permit an input/output (I/O) component to connect with one or more first connections of the plurality of first connections. The network device may include a switching component to connect with the I/O component via the one or more first connections or via the one or more first connections and one or more second connections. The switching component may be connected with the one or more second connections via a connector component that is removable from the switching component. The switching component may provide network traffic to or receive network traffic from the I/O component via the one or more first connections and the one or more second connections when the switching component is connected with the I/O component via the connector component. The switching component may provide network traffic to or receive network traffic from the I/O component via the one or more first connections and not the one or more second connections when the switching component is not connected with the I/O component via the connector component.

According to some possible implementations, a non-transitory computer-readable medium may store one or more instructions that, when executed by one or more processors of a network device, cause the one or more processors to receive network traffic to be provided to an input/output (I/O) component that is connected to the network device by one or more first connections via a chassis of the network device. The one or more instructions, when executed by one or more processors of a network device, cause the one or more processors to determine whether the I/O component is connected to the network device by one or more second connections. The one or more second connections may be connections via a connector component that connects the network device with the I/O component. The connector component may not be attached to the chassis. The one or more instructions, when executed by one or more processors of a network device, cause the one or more processors to selectively provide, to the I/O component, the network traffic via the one or more first connections or via the one or more first connections and the one or more second connections. The network traffic may be provided via the one or more first connections and the one or more second connections when the I/O component is associated with the one or more second connections. The network traffic may be provided via the one or more first connections and not via the one or more second connections when the I/O component is not associated with the one or more second connections.

According to some possible implementations a method may include receiving, by a switching component of a network device, network traffic to be provided to an I/O component of the network device. The method may include routing, by the switching component, the network traffic to the I/O component based on whether the I/O component is connected to the switching component via the one or more first connections and/or via one or more second connections. The one or more first connections may be connections via a chassis of the network device. The one or more second connections may be connections via a connector component that is removable from the switching component. The network traffic may be routed via the one or more first connections and the one or more second connections when the I/O component is connected via the one or more first connections and the one or more second connections. The network traffic may be routed via the one or more first connections and not via the one or more second connections when the I/O component is connected via the one or more first connections and not via the one or more second connections.

DETAILED DESCRIPTION

The following detailed description of example implementations refers to the accompanying drawings. The same reference numbers in different drawings may identify the same or similar elements.

A network device may route network traffic between devices that are connected to a network. Some network devices include a chassis to which I/O components (e.g., line cards, network interface cards, etc.) may be connected. For example, the chassis may include slots, sockets, or the like, to which the I/O components are mounted. The chassis may include a midplane or a backplane. Midplane connections may form connections, on or through the midplane, between the I/O components and a switching component of the network device. The connections and circuitry between the ingress and egress I/O components are sometimes referred to collectively as a switching fabric, and may include a set of crossbar switches, or the like.

As an example of routing network traffic via a network device, an ingress I/O component of the network device may receive the network traffic, and may provide the network traffic to the switching component via a midplane connection. After receiving the network traffic, the switching component may determine an egress I/O component via which the network traffic is to be provided to a destination, and may route the network traffic to the destination via the egress I/O component (e.g., on another midplane connection).

Usable bandwidth of the network device may be limited to approximately a sum of the bandwidths of the midplane connections associated with the chassis. The midplane connections may not be easily replaced. For example, the midplane connections may be hardwired to the chassis of the network device, may be etched into the chassis, may be permanently affixed to the chassis, or the like. As the network device ages, the usable bandwidth may become obsolete, thereby necessitating replacement of the network device, costly retrofitting of the midplane connections, or implementation of additional network devices.

Implementations described herein relate to a supplemental connector component that can be connected with a switching component of a network device. Dual plane I/O components may be connected with the switching component via both a chassis-based midplane connection and a supplemental connection with a supplemental connector component. As used herein, "dual plane" denotes that an I/O component is capable of connecting with a switching component via both a midplane connection and a supplemental (i.e., frontplane, front-panel, etc.) connection. As also used herein, "single plane" denotes that an I/O component is capable of connecting with a switching component via a midplane connection and not via a supplemental (i.e., frontplane, front-panel, etc.) connection.

As one possible example, the supplemental connector component may include a daughter board, and the supplemental connections may include cables that collectively form a supplemental connection fabric, or a cabled fabric, for communication between dual plane I/O components and the switching component. In such a case, the supplemental connector component may be referred to as a cabled fabric daughter board.

In some implementations, implementations described herein may be implemented without powering down the network device or negatively impacting bandwidth of the network device during installation, which improves network resilience and simplifies implementation. For example, the supplemental connector component, the dual plane I/O components, and the supplemental connections may be "hot-pluggable" or "hot-swappable" based on a configuration of the network device, which simplifies installation and upgrade of the supplemental connections.

Figure 1A:
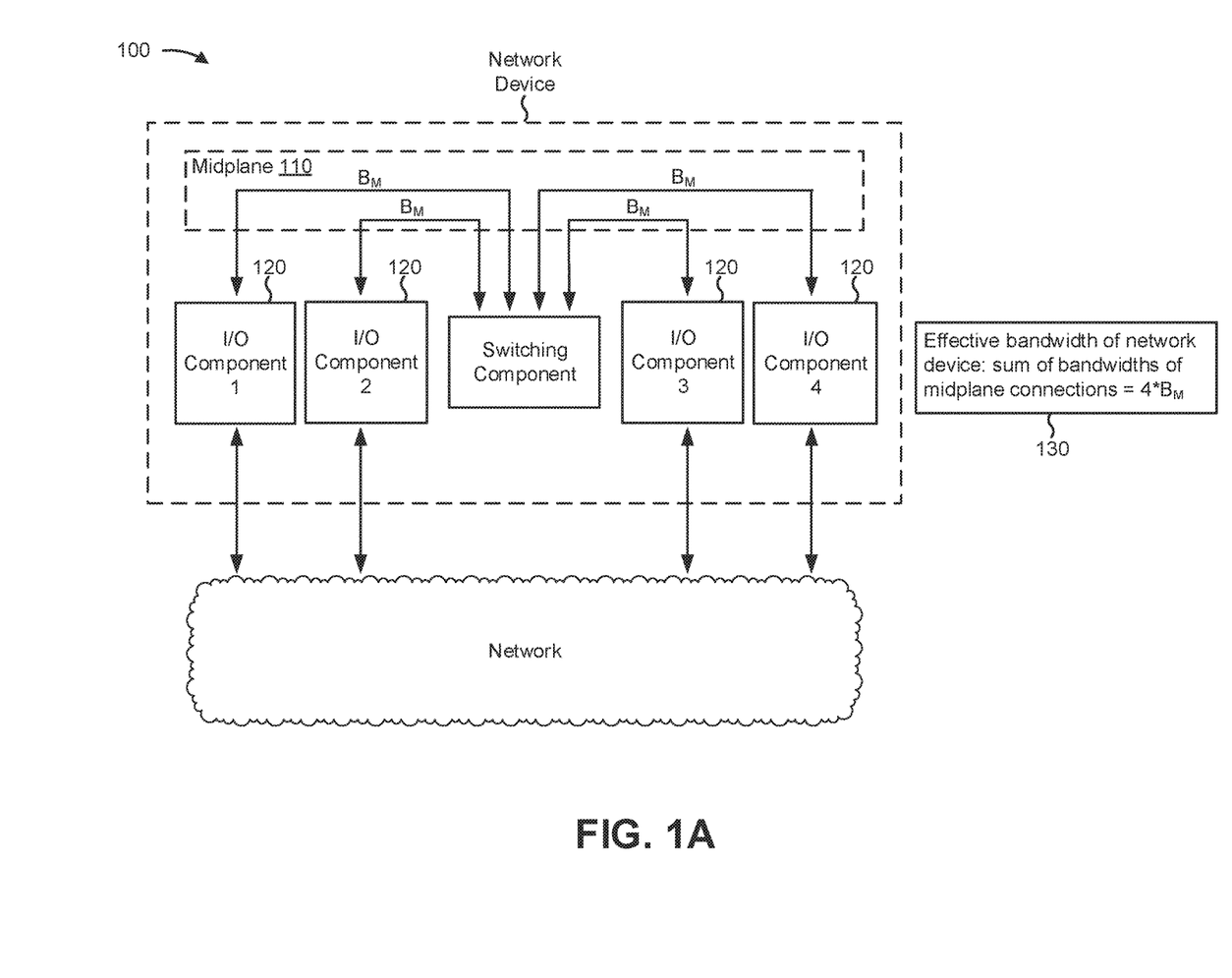
FIGS. 1A and 1B are diagrams of an overview of an example implementation described herein.

FIGS. 1A and 1B are diagrams of an overview of an example implementation 100 described herein. As shown in FIG. 1A, a network device may include a midplane 110. Midplane 110 may be included in chassis to which I/O components, shown by reference number 120, are connected. An I/O component may include, for example, a line card, a network interface card, an input component (e.g., an ingress component), an output component (e.g., an egress component), a combination of an input component and an output component, or the like. As further shown, the I/O components may communicate with a switching component of the network device via connections in midplane 110, hereinafter referred to as "midplane connections." As shown, each midplane connection may have a bandwidth of $B_M$. As shown by reference number 130, based on each midplane connection having a bandwidth $B_M$, a usable bandwidth of the network device is limited to the sum of the bandwidths of the midplane connections (e.g., $4*B_M$).

For example, network traffic to be routed from a source device to a destination device may arrive at an ingress I/O component, of the I/O components, from a network. The first I/O component may provide the network traffic to the switching component via one or more midplane connections. The switching component may determine an egress I/O component, of the I/O components, via which to provide the network traffic to the destination device (e.g., based on stored information identifying the egress I/O component). The switching component may provide the network traffic to the egress I/O component via a midplane connection, and the egress I/O component may transmit the network traffic toward the destination device via the network.

Figure 1B:
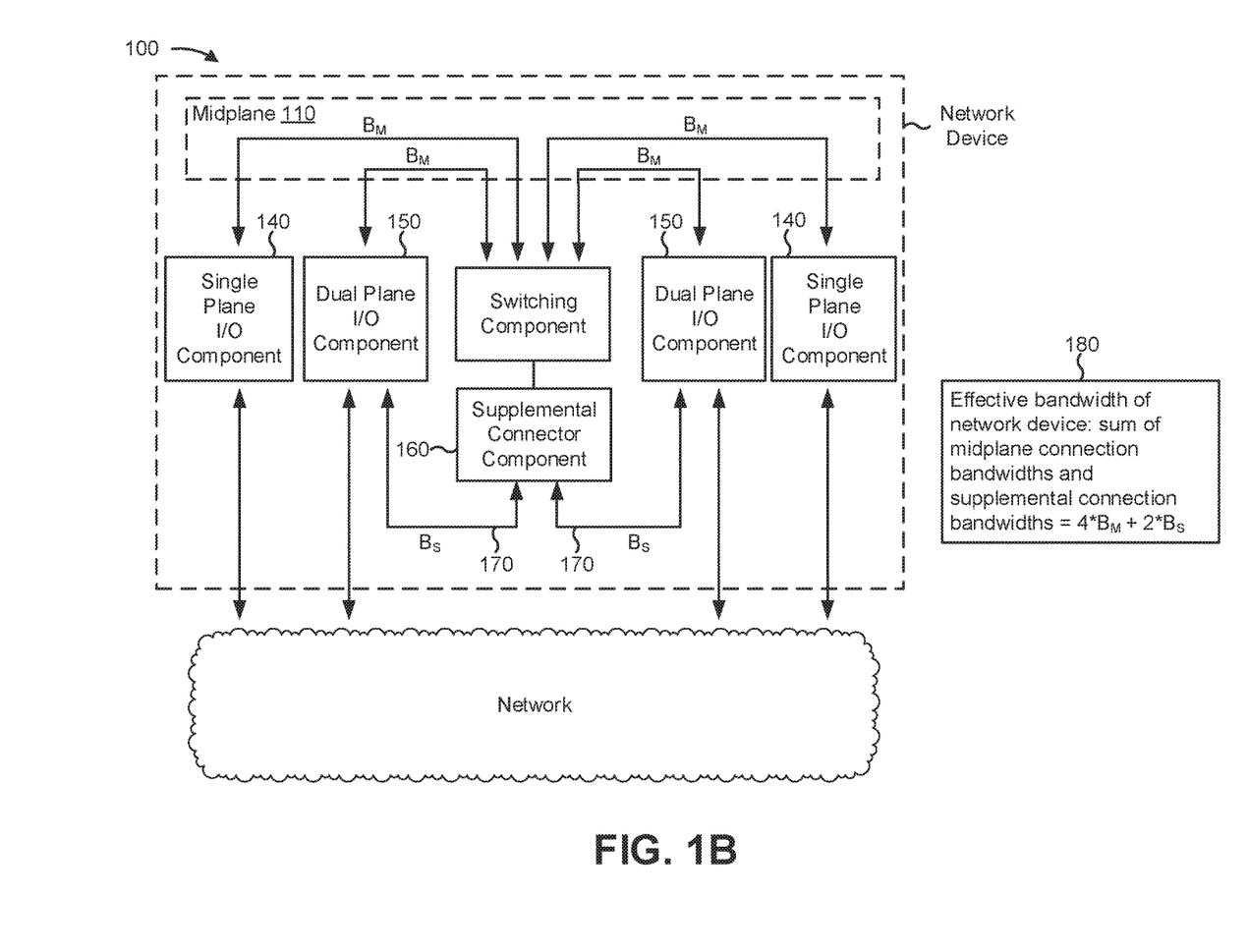

FIG. 1B is a diagram of an example implementation of a network device with supplemental fabric connections. As shown in FIG. 1B, implementations described herein may include single plane I/O components 140 and dual plane I/O components 150. The single-plane I/O components may connect with a switching component of the network device via midplane connections. The dual plane I/O components may connect with the switching component via midplane connections and a supplemental connector component, shown by reference number 160. The supplemental connector component may be connected with the switching component, and may provide a chip-to-chip connection between the dual plane I/O components and the switching component. For example, the supplemental connector component may include one or more components to convert a signal from a dual plane I/O component to a medium compatible with the switching component and/or to process signals from a dual plane I/O component to be compatible with the switching component.

As shown by reference number 170, the dual plane I/O components are connected to the supplemental connector component by supplemental connections that each have a bandwidth of $B_S$. In some implementations, $B_S$ may be equal to $B_M$. In some implementations, $B_S$ may be different than $B_M$. The supplemental connections may include optical connections, electrical connections, cabled connections, or the like.

The dual plane I/O components provide network traffic to the switching component via one or more midplane connections and via one or more supplemental connections (e.g., based on a network traffic apportionment process, based on values of $B_S$ and $B_M$, etc.), which increases bandwidth of the dual plane I/O components, and therefore increases bandwidth of the network device. As shown by reference number 180, the effective bandwidth of the network device may be approximately equal to a sum of the midplane connection bandwidths and the frontplane connection bandwidths, or $4*B_M+2*B_S$.

In this way, the supplemental connector component and the dual plane I/O components increase bandwidth of the network device using a supplemental connection fabric that is separate from the midplane connections of the network device. In some implementations, the supplemental connector component and the dual plane I/O cards may be implemented without powering down or retrofitting the network device, which simplifies implementation and improves network resilience.

As indicated above, FIGS. 1A and 1B are provided merely as an example. Other examples are possible and may differ from what was described with regard to FIGS. 1A and 1B.

Figure 2:
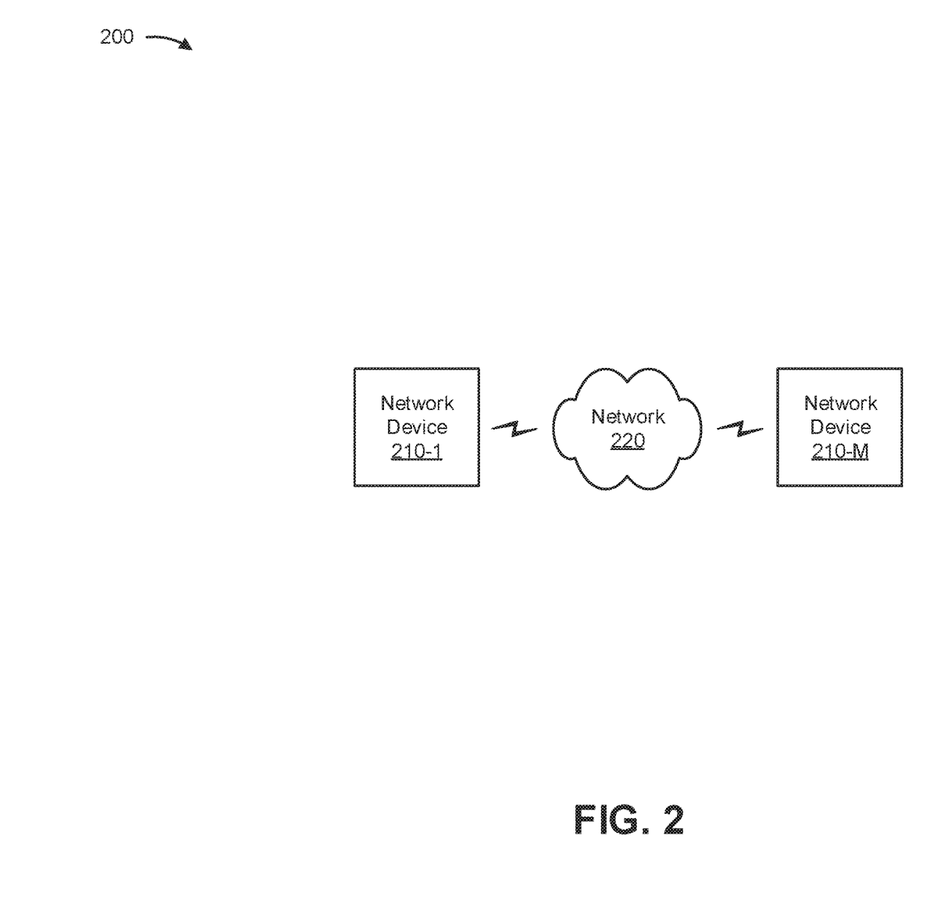
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-M (M≥1) (hereinafter referred to collectively as "network devices 210," and individually as "network device 210") and a network 220. Devices of environment 200 may interconnect via wired connections, wireless connections, or a combination of wired and wireless connections.

Network device 210 includes one or more devices (e.g., one or more traffic transfer devices) capable of processing and/or transferring network traffic between endpoint devices (e.g., devices connected to network 220). For example, network device 210 may include a firewall, a router, a gateway, a switch, a hub, a bridge, a reverse proxy, a server (e.g., a proxy server), a security device, an intrusion detection device, a load balancer, or a similar device. Network device 210 may have a chassis to which I/O components are connected, as described in more detail below.

Network 220 may include one or more wired and/or wireless networks. For example, network 220 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a private network, an ad hoc network, an intranet, the Internet, a fiber optic-based network, a cloud computing network, an optical connection, an electrical connection, or the like, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
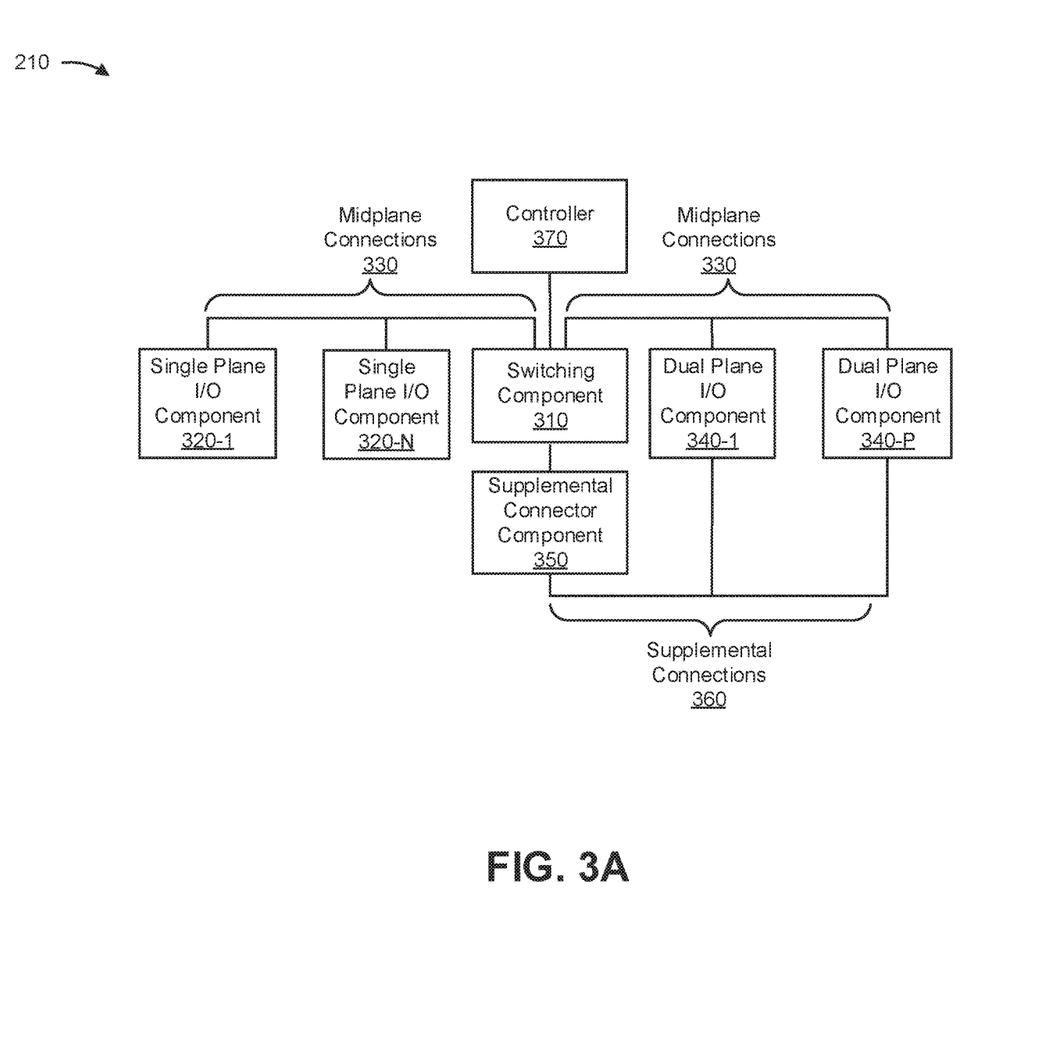
FIGS. 3A and 3B are diagrams of example components of one or more devices of FIG. 2.

FIG. 3A is a diagram of example components of network device 210, shown in FIG. 2. As shown, network device 210 may include a switching component 310, one or more single plane I/O components 320-1 through 320-N(N≥1) (hereinafter referred to collectively as "single plane I/O components 320," and individually as "single plane I/O component 320"), one or more midplane connections 330, one or more dual plane I/O components 340-1 through 340-P (P≥1) (hereinafter referred to collectively as "dual plane I/O components 340," and individually as "dual plane I/O component 340"), a supplemental connector component 350, one or more supplemental connections 360, and a controller 370. In some implementations, components of devices 300 may interconnect via wired connections.

Switching component 310 interconnects single plane I/O components 320 and dual plane I/O components 320. In some implementations, switching component 310 may be implemented via one or more crossbars, via one or more busses, and/or using shared memory. The shared memory may act as a temporary buffer to store packets from single plane I/O component 320 and/or dual plane I/O component 340 before the packets are eventually scheduled for delivery to a destination (e.g., single plane I/O component 320 or dual plane I/O component 340). In some implementations, switching component 310 may enable single plane I/O component 320, dual plane I/O component 340, and/or controller 370 to communicate (e.g., via midplane connection 330, supplemental connection 360, and/or a different type of connection).

Single plane I/O component 320 includes a component capable of communicating with switching component 310 via midplane connection 330. Single plane I/O component 320 may process incoming and/or outbound traffic, such as by performing data link layer encapsulation or decapsulation. In some implementations, single plane I/O component 320 may send and/or receive packets. In some implementations, single plane I/O component 320 may include a network interface card, an input line card, an output line card, and/or an input/output line card that includes one or more packet processing components (e.g., in the form of integrated circuits), such as one or more interface cards (IFCs), packet forwarding components, line card controller components, input ports, output ports, processors, memories, and/or input queues. In some implementations, the input line cards and/or the output line cards may include single plane I/O component 320 and/or dual plane I/O component 340.

Midplane connection 330 includes a chassis-based connection between switching component 310 and single plane I/O component 320 or dual plane I/O component 340, such as a crossbar, a switching fabric, an optical fiber, an electrical connection, or the like. "Chassis-based," as used herein, may indicate that midplane connection 330 is hardwired to a chassis of network device 210, that midplane connection 330 requires shutdown of network device 210 to replace, that midplane connection 330 requires costly reconstruction of network device 210 to replace, or the like. As other examples, a chassis-based midplane connection 330 may be etched from a substrate of network device 210, may be soldered to network device 210, or the like. In some implementations, line cards (e.g., single plane I/O component 320 and/or dual plane I/O component 340) may be connected with midplane connection 330 via a socket, a slot, a port, or the like, that is attached to a chassis of network device 210.

In some implementations, midplane connection 330 may include multiple, different connections between an I/O component and switching component 310. For example, midplane connection 330 may be implemented in a switching fabric of network device 210, and single plane I/O component 320 or dual plane I/O component 340 may be connected with switching component 310 via multiple, different connections in the switching fabric. The multiple, different connections may be shared by multiple single plane I/O components 320 and/or dual plane I/O components 340 based on bandwidth requirements of the multiple single plane I/O components 320 and/or dual plane I/O components 340.

Dual plane I/O component 340 includes a component capable of communicating with switching component 310 via midplane connection 330 and via supplemental connection 360. Dual plane I/O component 340 may process incoming and/or outbound traffic, such as by performing data link layer encapsulation or decapsulation. In some implementations, dual plane I/O component 340 may send and/or receive packets. In some implementations, dual plane I/O component 340 may include a network interface, an input line card, an output line card, and/or an input/output line card that includes one or more packet processing components (e.g., in the form of integrated circuits), such as one or more interface cards (IFCs), packet forwarding components, line card controller components, input ports, output ports, processors, memories, and/or input queues. Dual plane I/O component 340 may include ports to which supplemental connections 360 can be connected, such as a pluggable cable port, or the like.

Supplemental connector component 350 includes a component (e.g., a card, a daughter board, a chip, a converter, etc.) that enables switching component 310 and dual plane I/O component 340 to communicate via supplemental connection 360. In some implementations, supplemental connector component 350 receives network traffic from switching component 310 en route to dual plane I/O component 340 and provides the network traffic to dual plane I/O component 340 via supplemental connection 360. In some implementations, supplemental connector component 350 receives network traffic from dual plane I/O component 340 and via supplemental connection 360 and provides the network traffic to switching component 310 (e.g., without converting a medium of the network traffic or after converting the network traffic to a different medium).

In some implementations, supplemental connector component 350 may include an optical/electrical converter, an electrical retimer, an electrical repeater, or the like, to facilitate a chip-to-chip link between switching component 310 and dual plane I/O component 340 and/or to convert between an optical signal medium and an electrical signal medium.

In some implementations, supplemental connector component 350 may connect with switching component 310 via a slot, a socket, a port, or the like. In some implementations, multiple supplemental connector components 350 may be connected with a single switching component 310, which increases effective bandwidth of network device 210.

Supplemental connection 360 includes a connection between dual plane I/O component 340 and supplemental connector component 350. In some implementations, supplemental connection 360 may be a non-chassis-based connection. For example, supplemental connection 360 may include a cable, a wire, or the like, that can be removed from supplemental connector component 350 and/or dual plane I/O component 340 without removing network device 210 from service. Supplemental connection 360 may connect to dual plane I/O component 340 and/or supplemental connector component 350 via a port, a plug, or the like.

Controller 370 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 370 may include one or more processors that can be programmed to perform a function.

In some implementations, controller 370 may include a random access memory (RAM), a read only memory (ROM), and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to network device 210 to exchange information regarding network topology. Controller 370 may create forwarding tables based on the network topology information, may create forwarding tables based on the forwarding tables, and may forward the forwarding tables to single plane I/O component 320 and/or dual plane I/O component 340. Single plane I/O component 320 and/or dual plane I/O component 340 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 370 from another computer-readable medium or from another device via a communication interface. When executed, software instructions stored in a memory and/or a storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

Figure 3B:
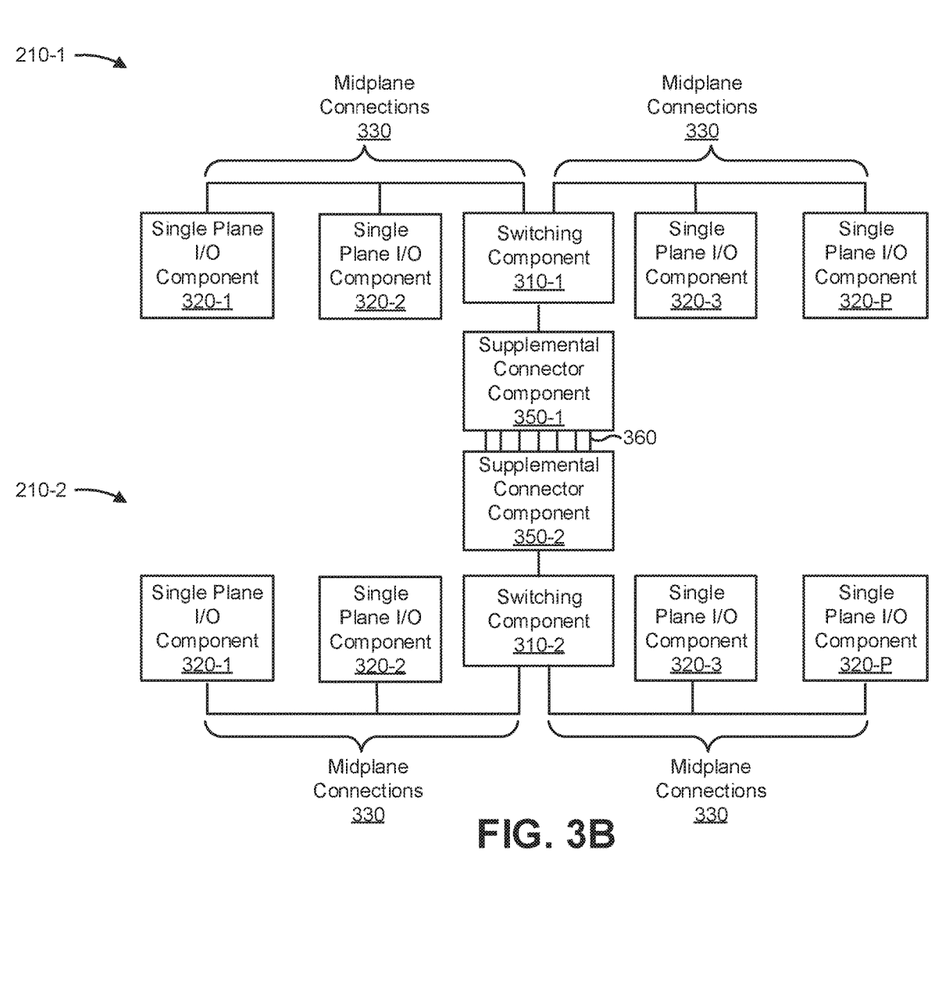

FIG. 3B is a diagram of an example implementation of using supplemental connector component 350 as a connector between two network devices 210. For example, a first network device 210 and a second network device 210 may include a first switching component 310-1 and a second switching component 310-2, respectively, which may be connected with a first supplemental connector component 350-1 and a second supplemental connector component 350-2, respectively. One or more supplemental connections 360 may connect the first supplemental connector component 350 with the second supplemental connector component 350. In this way, the first switching component 310 may route network traffic to the second switching component 310 via the one or more supplemental connections 360, which may increase bandwidth of a link between the first network device 210 and the second network device 210. Furthermore, the first supplemental connector component 350 and the second supplemental connector component 350, and the one or more supplemental connections 360, may be implemented using similar components to those described in connection with adding a supplemental connector fabric to a single network device 210, which improves versatility and reduces cost of implementation.

The number and arrangement of components shown in FIGS. 3A and 3B are provided as an example. In practice, network device 210 may include additional components, fewer components, different components, or differently arranged components than those shown in FIGS. 3A and 3B. Additionally, or alternatively, a set of components (e.g., one or more components) of network device 210 may perform one or more functions described as being performed by another set of components of network device 210.

Figure 4:
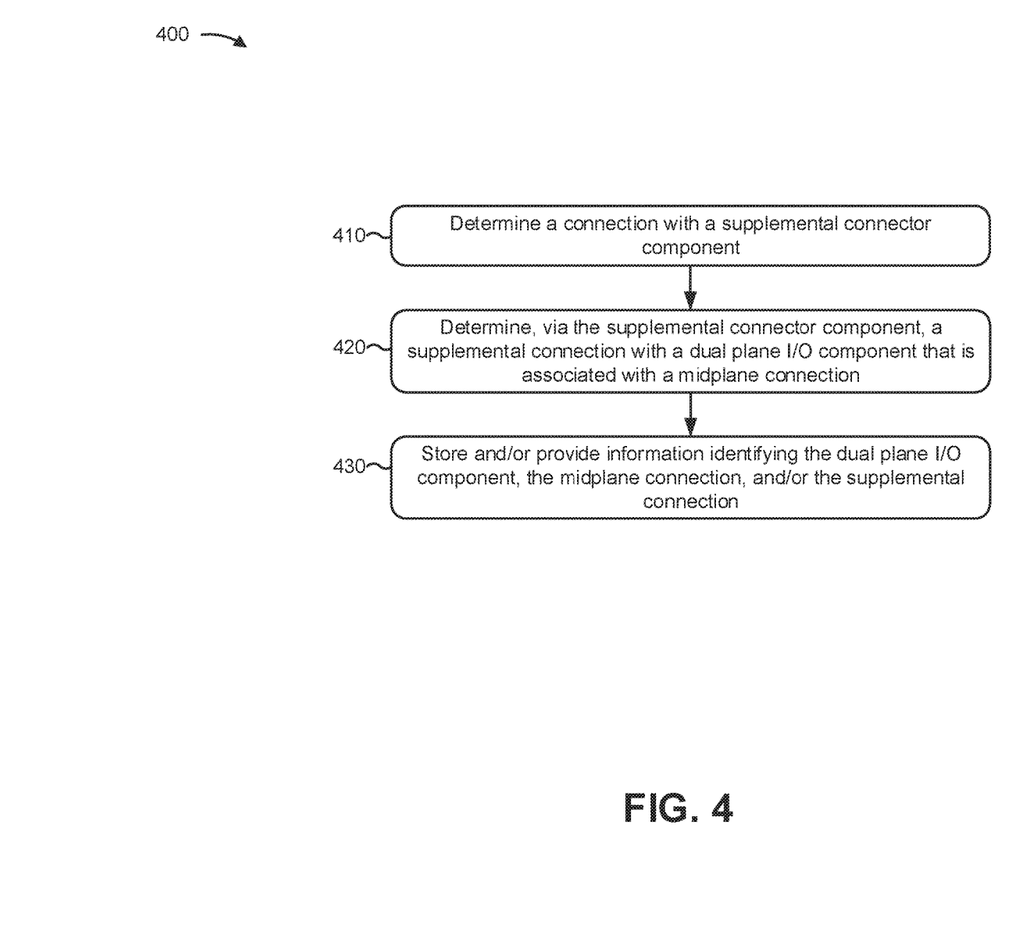
FIG. 4 is a flow chart of an example process for configuring a dual plane I/O component and/or a supplemental connector component.

FIG. 4 is a flow chart of an example process 400 for configuring a dual plane I/O component and/or a supplemental connector component. In some implementations, one or more process blocks of FIG. 4 may be performed by network device 210 (e.g., switching component 310 of network device 210). In some implementations, one or more process blocks of FIG. 4 may be performed by another component of network device 210, such as single plane I/O component 320, dual plane I/O component 340, and/or controller 370.

As shown in FIG. 4, process 400 may include determining a connection with a supplemental connector component (block 410). For example, switching component 310 may determine a connection with supplemental connector component 350. In some implementations, switching component 310 may include a port, a slot, a socket, etc. via which supplemental connector component 350 may be connected, and switching component 310 may determine a connection with supplemental connector component 350 via the port, slot, socket, etc. In some implementations, supplemental connector component 350 may be connected to switching component 310 without removing network device 210 from service (i.e., supplemental connector component 350 may be "hot-pluggable"), which may reduce impact on network performance of installing supplemental connector component 350.

As further shown in FIG. 4, process 400 may include determining, via the supplemental connector component, a supplemental connection with a dual plane I/O component that is associated with a midplane connection (block 420). For example, switching component 310 may determine a supplemental connection 360 with dual plane I/O component 340 (e.g., via supplemental connector 360). In some implementations, dual plane I/O component 340 may be connected with switching component 310 via midplane connection 330, and a user may connect dual plane I/O component 340 with supplemental connector component 350 via supplemental connection 360. For example, a user may plug dual plane I/O component 340 into midplane connection 330 on a chassis of network device 210, and may connect dual plane I/O component 340 with supplemental connector component 350 using supplemental connection 360.

Switching component 310 may determine or receive information identifying dual plane I/O component 340 based on detecting supplemental connection 360 and/or midplane connection 330. For example, when dual plane I/O component 340 or single plane I/O component 320 is connected with switching component 310 via midplane connection 330, dual plane I/O component 340 or single plane I/O component 320 may transmit component information relating to dual plane I/O component 340 or single plane I/O component 320 (e.g., a device identifier, a media access control (MAC) address, a network address, a bandwidth of dual plane I/O component 340 or single plane I/O component 320, etc.).

Similarly, when dual plane I/O component 340 connects with switching component 310 via supplemental connection 360, dual plane I/O component 340 may transmit component information, relating to dual plane I/O component 340, to switching component 310 (e.g., a capacity of supplemental connection 360, a combined capacity of supplemental connection 360 and midplane connection 330, a device identifier, a MAC address, a network address, a bandwidth of dual plane I/O component 340, etc.). Switching component 310 may use the component information to route network traffic via single plane I/O component 320 and/or dual plane I/O component 340, as described in more detail below.

As further shown in FIG. 4, process 400 may include storing and/or providing component information identifying the dual plane I/O component, the midplane connection, and/or the supplemental connection (block 430). For example, when switching component 310 connects with a component (e.g., single plane I/O component 320, dual plane I/O component 340, and/or supplemental connector component 350), switching component 310 may receive and/or determine component information identifying the component. The information may identify a network address, a device identifier, a bandwidth of the component, a ratio of bandwidth of midplane connection 330 to supplemental connection 360 for the component, or the like. Switching component 310 may use the component information to configure the component or route network traffic via the component.

In some implementations, switching component 310 may store the component information. For example, single plane I/O component 320 may store and/or use a forwarding table that identifies a set of rules for routing network traffic in network device 210. The forwarding table may identify single plane I/O component 320 and/or dual plane I/O component 340, bandwidth of midplane connection 330, bandwidth of supplemental connection 360, network addresses associated with single plane I/O component 320 and/or dual plane I/O component 340, or the like. Single plane I/O component 320 or controller 370 may configure the forwarding table to route network traffic via midplane connection 330 and supplemental connection 360 based on the component information, as described in more detail below.

In some implementations, switching component 310 may provide the component information. For example, switching component 310 may provide the component information to single plane I/O component 320 and/or dual plane I/O component 340. When single plane I/O component 320 or dual plane I/O component 340 receives network traffic from network 220 (i.e., network traffic inbound to network device 210), single plane I/O component 320 or dual plane I/O component 340 routes the network traffic to switching component 310 based on the component information. When dual plane I/O component 340 routes network traffic to switching component 310, dual plane I/O component 340 may use the component information to apportion the network traffic between midplane connection 330 and supplemental connection 360 based on bandwidths of midplane connection 330 and supplemental connection 360 (i.e., to load balance the network traffic), as described in more detail below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
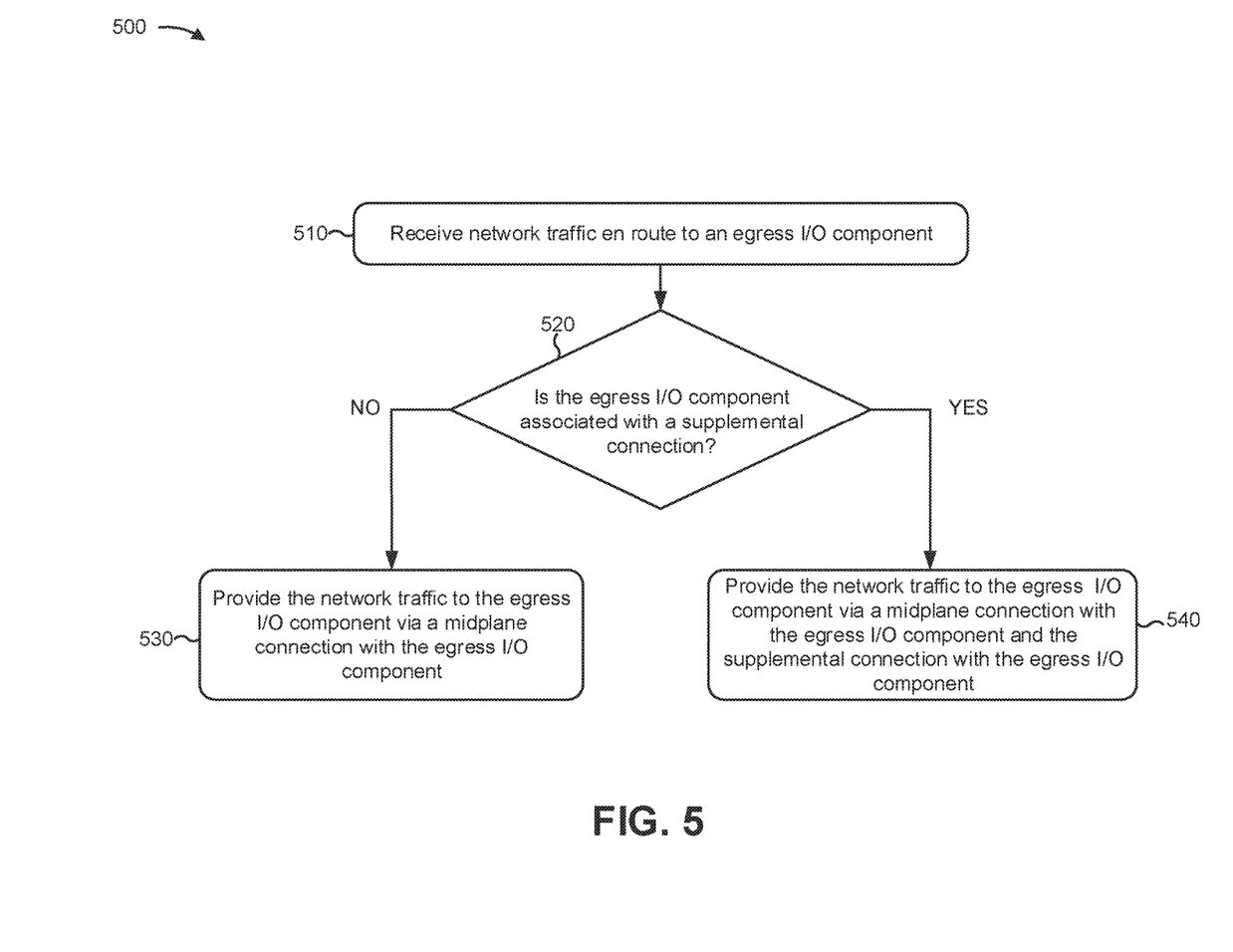
FIG. 5 is a flow chart of an example process for routing or switching network traffic via a network device that includes a supplemental connection fabric.

FIG. 5 is a flow chart of an example process 500 for routing or switching network traffic via a network device that includes a supplemental connection fabric. In some implementations, one or more process blocks of FIG. 5 may be performed by network device 210 (e.g., switching component 310 of network device 210). In some implementations, one or more process blocks of FIG. 5 may be performed by another component of network device 210, such as single plane I/O component 320, dual plane I/O component 340, and/or controller 370.

As shown in FIG. 5, process 500 may include receiving network traffic en route to an egress I/O component (block 510). For example, switching component 310 may receive network traffic en route to an egress I/O component. In some implementations, the egress I/O component may be a single plane I/O component 320. In some implementations, the egress I/O component may be a dual plane I/O component 340. Switching component 310 may receive the network traffic to route the network traffic to the egress I/O component via midplane connection 330 (e.g., when an ingress I/O component associated with the network traffic is a single plane I/O component 320) or via midplane connection 330 and/or supplemental connection 360 (e.g., when the ingress I/O component associated with the network traffic is a dual plane I/O component 340).

Switching component 310 may determine the egress I/O component based on forwarding information associated with the network traffic. For example, the network traffic may include packets, cells, frames, or the like, that are associated with routing information identifying a destination of the network traffic (e.g., a destination device connected to network 220, an egress I/O component, a next hop device on a route to reach the destination device, etc.). Based on the forwarding information, switching component 310 may determine the egress I/O component. For example, when the forwarding information identifies the egress I/O component, switching component 310 may determine the egress I/O component based on parsing the forwarding information. When the forwarding information identifies a destination device connected to network device 210 or network 220, switching component 310 may use a forwarding table to identify an egress I/O component via which to route the network traffic toward the destination device.

In some implementations, switching component 310 may receive the network traffic via midplane connection 330 and not supplemental connector component 350. For example, when switching component 310 receives the network traffic from an ingress single plane I/O component 320, switching component 310 may receive the network traffic via one or more midplane connections 330.

In some implementations, switching component 310 may receive network traffic via midplane connection 330 and via supplemental connector component 350 corresponding to one or more supplemental connections 360. For example, when an ingress dual plane I/O component 340 provides network traffic to switching component 310, the ingress dual plane I/O component 340 provides network traffic via midplane connection 330 and supplemental connection 360, thereby increasing effective bandwidth of network device 210. In such implementations, the ingress dual plane I/O component 340 may provide first portions of network traffic via midplane connection 330 and second portions of network traffic via supplemental connection 360. For example, the ingress dual plane I/O component 340 may divide the network traffic into the first portions and the second portions based on respective bandwidths of midplane connection 330 and supplemental connection 360, based on respective quantities of network traffic queued for midplane connection 330 and supplemental connector 360, or the like. The ingress dual plane I/O component 340 may transmit the first portions and the second portions via midplane connection 330 and supplemental connection 360, respectively. Switching component 310 may generate a network traffic flow from the first portions and the second portions, and may provide the network traffic flow to an egress I/O component.

As further shown in FIG. 5, process 500 may include determining whether the egress I/O component is associated with a supplemental connection (block 520). For example, switching component 310 may determine whether the egress I/O component is connected with supplemental connector component 350 via supplemental connection 360. In some implementations, switching component 310 may determine whether the egress I/O component is associated with a supplemental connection 360 based on component information associated with the egress I/O component. For example, when a particular dual plane I/O component 340 is connected with switching component 310 via supplemental connector component 350, switching component 310 may store component information indicating that dual plane I/O component 340 is associated with a supplemental connection 360.

As further shown in FIG. 5, when switching component 310 determines that the egress I/O component is not associated with a supplemental connection (block 520—NO), process 500 may include providing the network traffic to the egress I/O component via a midplane connection with the egress I/O component (block 530). For example, when the egress I/O component is a single plane I/O component 320, or is a dual plane I/O component 340 that is not connected with supplemental connector component 350, the egress I/O component is not associated with a supplemental connection 360. In such cases, switching component 310 may provide network traffic to the egress I/O component via one or more midplane connections 330.

As further shown in FIG. 5, when switching component 310 determines that the egress I/O component is associated with a supplemental connection (block 520 YES), process 500 may include providing the network traffic to the egress I/O component via a midplane connection with the egress I/O component and the supplemental connection with the egress I/O component (block 540). For example, when the egress I/O component is a dual plane I/O component 340 that is connected with supplemental connector component 350 via a supplemental connection 360, switching component 310 may provide network traffic to the egress I/O component via the supplemental connection 360 and via midplane connection 330 with the egress I/O component.

As an example, assume that network device 210 is associated with 24 midplane connections 330 that each has an effective bandwidth of 24 gigabits per second. As used herein, an effective bandwidth refers to a total bandwidth of a connection, adjusted to account for bandwidth that is to be used for packet headers, system management, forward error correction, or the like. In other words, the effective bandwidth of a connection is a bandwidth of the connection that can be used for network traffic payloads.

Continuing the above example, when communicating via the midplane connections 330, network device 210 may have a total usable bandwidth of 576 gigabits per second (i.e., 24 gigabits per second multiplied by 24 connections). Now assume that a user connects supplemental connector component 350 to network device 210, and connects 12 supplemental connections 360 with respective dual plane I/O components 340. Assume further that each supplemental connection 360 has an effective bandwidth of 20 gigabits per second. In that case, network device 210 may have an additional 240 gigabits per second of available bandwidth, for a total usable bandwidth of 816 gigabits per second. This can be accomplished without modifying midplane connections 330 and without modifying a chassis of network device 210. Furthermore, the configuration information for switching component 310 and/or controller 370 to implement the dual plane routing configuration may be provided to switching component 310 and/or controller 370 in a firmware update, thereby simplifying implementation of the supplemental connection fabric.

In some implementations, switching component 310 may apportion network traffic between multiple connections (i.e., one or more midplane connections 330 and one or more supplemental connections 360) based on available bandwidth of each of the multiple connections. For example, assume that midplane connection 330 to dual plane I/O component 340 is associated with 10 gigabits of available bandwidth, and assume that supplemental connection 360 to dual plane I/O component 340 is associated with 20 gigabits of available bandwidth. In that case, network device 210 may route two-thirds of a network traffic flow (e.g., two-thirds of packets, cells, frames, etc. included in the network traffic flow) via supplemental connection 360, and may route one-third of the network traffic flow via midplane connection 330. In this way, switching component 310 improves efficiency of bandwidth usage, thereby increasing an effective bandwidth of network device 210.

In some implementations, switching component 310 may perform such a bandwidth apportionment process among multiple midplane connections 330 and/or supplemental connections 360, which further increases effective bandwidth of network device 210. For example, network device 210 may include multiple midplane connections 330 between a particular I/O component (e.g., single plane I/O component 320 or dual plane I/O component 340) and switching component 310 and/or multiple supplemental connections 360 between the particular I/O component and switching component 310.

In some implementations, supplemental connection 360 may use optical connections, which may increase bandwidth available via supplemental connection 360. In such implementations, supplemental connector component 350 may include optical/electrical converters corresponding to supplemental connections 360, which permits dual plane I/O component 340 to communicate with a switching component 310 configured for electrical midplane connections 330. In some implementations, the optical/electrical converters may be included in another component of network device 210, such as switching component 310, single plane I/O component 320, dual plane I/O component 340, or controller 370.

In some implementations, supplemental connection 360 may use an electrical connection (e.g., a copper connection, a gold connection, or a connection using another electrical conductor), which may reduce cost of implementing supplemental connection 360. In such implementations, supplemental connector component 350 may include electrical retimers or electrical repeaters that permit dual plane I/O component 340 to communicate with switching component 310 using supplemental connection 360.

In some implementations, switching component 310 may be associated with multiple, different supplemental connector components 350, which may increase effective bandwidth of network device 210. Further, in some implementations, one of a set of supplemental connector components 350 may be disconnected from switching component 310 without impacting performance of others of the set of supplemental connector components 350. In other words, supplemental connector component 350 may be "hot-swappable," which simplifies implementation of supplemental connector component 350 and which reduces impact of disconnecting supplemental connector component 350 on effective bandwidth of network device 210.

In some implementations, supplemental connector component 350 may be used as a connector between two network devices 210. For example, a first network device 210 and a second network device 210 may include a first switching component 310 and a second switching component 310, respectively, which may be connected with a first supplemental connector component 350 and a second supplemental connector component 350, respectively. One or more supplemental connections 360 may connect the first supplemental connector component 350 with the second supplemental connector component 350. In this way, the first switching component 310 may route network traffic to the second switching component 310 via the one or more supplemental connections 360, which may increase bandwidth of a link between the first network device 210 and the second network device 210. Furthermore, the first supplemental connector component 350 and the second supplemental connector component 350, and the one or more supplemental connections 360, may be implemented using similar components to those described in connection with adding a supplemental connector fabric to a single network device 210, which improves versatility and reduces cost of implementation.

In this way, supplemental connector component 350 and supplemental connections 360 provide a supplemental connector fabric for a chassis-based network device 210, which improves bandwidth of network device 210, and which may be implemented without modifying a midplane or a chassis of network device 210.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, network traffic or traffic may refer to information communicated using a communication structure, such as a protocol data unit (PDU), a packet, a frame, a datagram, a segment, a message, a block, a cell, a subframe, a slot, a symbol, a portion of any of the above, and/or another type of formatted or unformatted unit of data capable of being transmitted via a network or internal to a network device.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   a chassis that includes a plurality of first connections,
      the chassis enabling an input/output (I/O) component to connect with one or more first connections of the plurality of first connections; and
   a switch that connects with the I/O component via the one or more first connections or via the one or more first connections, one or more second connections, and a supplemental connector component that is removable from the switch,
      the switch, when connected with I/O component via the one or more first connections, the one or more second connections, and the supplemental connector component, to:
         provide a first portion of network traffic to or receive the first portion of the network traffic from the I/O component via the one or more first connections, and
         provide a second portion of the network traffic to or receive the second portion of the network traffic from the I/O component via the supplemental connector component and the one or more second connections, or
      the switch, when not connected with the I/O component via the supplemental connector component, to:
         provide the network traffic to or receive the network traffic from the I/O component via the one or more first connections and not the one or more second connections.

2. The network device of claim 1, where the switch is further to:
   combine, based on receiving the first portion via the one or more first connections and the second portion via the one or more second connections and the supplemental connector component, the first portion and the second portion to form a network traffic flow; and
   provide, to an egress I/O component, the network traffic flow.

3. The network device of claim 1, where the switch is further to:
   determine that network traffic is to be provided to the I/O component via the one or more first connections and the one or more second connections;
   divide the network traffic into the first portion to be provided via the one or more first connections and the second portion to be provided via the one or more second connections and the supplemental connector component; and
   provide the first portion via the one or more first connections and the second portion via the one or more second connections and the supplemental connector component.

4. The network device of claim 3, where the switch is further to:
   select sizes of the first portion and the second portion based on an available bandwidth of the one or more first connections and an available bandwidth of the one or more second connections.

5. The network device of claim 1, where the network traffic is converted between a first signal medium associated with the switch and a second signal medium associated with the one or more second connections.

6. The network device of claim 5, where the network traffic is converted via one or more optical or electrical converters between the first signal medium and the second signal medium.

7. The network device of claim 1, where the supplemental connector component comprises at least one of:
   an electrical retimer, or
   an electrical repeater.

8. The network device of claim 1, where the supplemental connector component comprises a board that is mountable to the switch.

9. A non-transitory computer-readable medium storing instructions, the instructions comprising:
   one or more instructions that, when executed by one or more processors of a network device, cause the one or more processors to:
      receive network traffic to be provided to an input/output (I/O) component that is connected to the network device by one or more first connections via a chassis of the network device;
      determine whether the I/O component is connected with a switch via at least one of the one or more first connections, one or more second connections, or a supplemental connector component,
         the supplemental connector component not being attached to the chassis; and
      selectively provide, to the I/O component, the network traffic via the one or more first connections or via the one or more first connections, the one or more second connections, and the supplemental connector component,
         a first portion of the network traffic being provided via the one or more first connections, and a second portion of the network traffic being provided via the supplemental connector component and the one or more second connections when the I/O component is connected with the switch via the one or more first connections, the one or more second connections, and the supplemental connector component, or
         the network traffic being provided via the one or more first connections and not via the one or more second connections when the I/O component is not connected with the switch via the supplemental connector component.

10. The non-transitory computer-readable medium of claim 9, where the one or more first connections are associated with a first bandwidth and the one or more second connections are associated with a second bandwidth; and
   where the one or more instructions, that cause the one or more processors to provide the network traffic via the one or more first connections, the one or more second connections, and the supplemental connector component, cause the one or more processors to:
      provide the first portion of the network traffic via the one or more first connections based on the first bandwidth and provide the second portion of the network traffic via the one or more second connections and the supplemental connector component based on the second bandwidth.

11. The non-transitory computer-readable medium of claim 9, where the supplemental connector component is a first supplemental connector component; and
   where the network device is connected with a second supplemental connector component; and
   where the one or more instructions, when executed by the one or more processors, further cause the one or more processors to:
      detect that the first supplemental connector component has been removed; and route the first portion of the network traffic via the one or more first connections and the second portion of the network traffic via one or more third connections associated with the second supplemental connector component to the I/O component,
the one or more third connections connecting the second supplemental connector component with the I/O component.

12. The non-transitory computer-readable medium of claim 9, where the I/O component is an egress I/O component; and
where the one or more instructions, when executed by the one or more processors, further cause the one or more processors to:
receive the first portion of the network traffic from a source I/O component via one or more third connections,
the source I/O component to be connected with the network device via the one or more third connections and via a fourth connection of the supplemental connector component;
receive the second portion of the network traffic via the fourth connection;
combine the first portion and the second portion into a network traffic flow; and
provide the network traffic flow to the egress I/O component.

13. The non-transitory computer-readable medium of claim 9, where the one or more first connections comprise at least one of:
a switching fabric,
an optical fiber,
an electrical connection, or
a plurality of crossbar switches.

14. The non-transitory computer-readable medium of claim 9, where the I/O component is a first I/O component; and
where the one or more instructions, when executed by the one or more processors, further cause the one or more processors to:
detect a second I/O component via a third connection,
the second I/O component being detected based on the second I/O component being mounted to the chassis;
determine whether the second I/O component is connected with the network device via a fourth connection,
the fourth connection being via the supplemental connector component; and
store or provide information indicating whether the second I/O component is connected with the network device via the fourth connection.

15. A method, comprising:
receiving, by a switch of a network device, network traffic to be provided to an I/O component of the network device; and
routing, by the switch, the network traffic to the I/O component based on whether the I/O component is connected to the switch via one or more first connections and/or via one or more second connections,
the one or more first connections being connections via a chassis of the network device, and
the one or more second connections being connections via a supplemental connector component that is removable from the switch,
a first portion of the network traffic being routed via the one or more first connections and a second portion of the network traffic being routed via the one or more second connections when the I/O component is connected to the switch via the one or more first connections and the one or more second connections, or
the network traffic being routed via the one or more first connections and not via the one or more second connections when the I/O component is connected via the one or more first connections and not via the one or more second connections.

16. The method of claim 15, where the I/O component is a first I/O component; and
where receiving the network traffic comprises:
receiving, from a second I/O component, the network traffic.

17. The method of claim 15, further comprising:
selectively receiving, from a second I/O component, the network traffic via the chassis, or via the chassis and the supplemental connector component,
the network traffic being received from the second I/O component via the chassis and the supplemental connector component when the second I/O component is connected with the switch via the supplemental connector component, or
the network traffic being received from the second I/O component via the chassis and not via the supplemental connector component when the second I/O component is not connected with the switch via the supplemental connector component.

18. The method of claim 17, further comprising:
dividing, based on bandwidths of the one or more first connections and the one or more second connections, the network traffic into the first portion and the second portion; and
where routing the network traffic to the I/O component comprises:
routing, based on dividing the network traffic in the first portion and the second portion and when the I/O component is connected to the switch via the one or more first connections and the one or more second connections, the first portion to the I/O component via the one or more first connections and the second portion to the I/O component via the one or more second connections.

19. The method of claim 15, further comprising:
determining respective capacities of the one or more first connections and the one or more second connections; and
determining relative sizes of the first portion and the second portion being determined based on the respective capacities of the one or more first connections and the one or more second connections; and
where routing the network traffic to the I/O component comprises:
routing, based on determining the relative sizes and when the I/O component is connected to the switch via the one or more first connections and the one or more second connections, the first portion to the I/O component via the one or more first connections and the second portion to the I/O component via the one or more second connections.

20. The method of claim 15, further comprising:
determining, based on stored information, whether the I/O component is connected to the switch via the one or more second connections, the stored information being determined based on detecting the one or more first connections or the one or more second connections with the I/O component.

\* \* \* \* \*

UNITED STATES PATENT AND TRADEMARK OFFICE
CERTIFICATE OF CORRECTION

PATENT NO. : 10,277,534 B2
APPLICATION NO. : 15/170608
DATED : April 30, 2019
INVENTOR(S) : Kenney et al.

Page 1 of 1

It is certified that error appears in the above-identified patent and that said Letters Patent is hereby corrected as shown below:

In the Claims

In Claim 19, Column 18, Line 52, "second portion being determined based on the" should be changed to --second portion based on the--.

Signed and Sealed this
Ninth Day of June, 2020

Andrei Iancu
*Director of the United States Patent and Trademark Office*